US010895290B2

United States Patent
Ono et al.

(10) Patent No.: US 10,895,290 B2
(45) Date of Patent: Jan. 19, 2021

(54) HYDRAULIC SYSTEM

(71) Applicant: HONDA MOTOR CO., LTD., Tokyo (JP)

(72) Inventors: Junya Ono, Wako (JP); Yoshiaki Nedachi, Wako (JP); Eisuke Kajihara, Wako (JP); Hiroyuki Kojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 15/447,823

(22) Filed: Mar. 2, 2017

(65) Prior Publication Data

US 2017/0268587 A1 Sep. 21, 2017

(30) Foreign Application Priority Data

Mar. 18, 2016 (JP) .................................. 2016-055458

(51) Int. Cl.
*F16D 48/06* (2006.01)
*F16D 48/02* (2006.01)
*F16D 48/00* (2006.01)

(52) U.S. Cl.
CPC ........... *F16D 48/066* (2013.01); *F16D 25/14* (2013.01); *F16D 48/00* (2013.01); *F16D 48/02* (2013.01);
(Continued)

(58) Field of Classification Search
CPC ............. F16D 48/02; F16D 2048/0203; F16D 2048/0245; F16D 2048/0263;
(Continued)

(56) References Cited

U.S. PATENT DOCUMENTS

2006/0042907 A1* 3/2006 Ronk .................... F16D 29/005
192/85.59
2006/0108868 A1* 5/2006 Ohsaki .................... B60T 7/122
303/154
2016/0341265 A1 11/2016 Heubner

FOREIGN PATENT DOCUMENTS

DE  10 2005 006 431 A1  8/2006
DE  10 2011 003 042 A1  7/2012
(Continued)

OTHER PUBLICATIONS

Extended European Search Report dated Sep. 6, 2017 in the corresponding EP Patent Application 17158837.9.

*Primary Examiner* — Richard M Lorence
(74) *Attorney, Agent, or Firm* — Carrier Blackman & Associates, P.C.; Joseph P. Carrier; Jeffrey T. Gedeon

(57) ABSTRACT

A hydraulic system includes a normally open-type hydraulic clutch which connects or disconnects a power transmission line between an engine and a wheel, an actuator which supplies a hydraulic pressure to the hydraulic clutch, an oil flow path which connects the actuator to the hydraulic clutch, a valve member which is provided on the oil flow path and which enables to switch between an open state where the oil flow path communicates and a closed state where the oil flow path closes, a hydraulic pressure sensor which is provided on the oil flow path, and a bypass flow path which bypasses the valve member. A one-way valve, which permits a supply of a hydraulic pressure from an actuator side to a hydraulic clutch side and which shuts off a supply of a hydraulic pressure from the hydraulic clutch side to the actuator side, is provided on the bypass flow path.

10 Claims, 11 Drawing Sheets

(52) U.S. Cl.
CPC ............... *F16D 2048/0203* (2013.01); *F16D 2048/0245* (2013.01); *F16D 2048/0263* (2013.01); *F16D 2048/0266* (2013.01); *F16D 2048/0275* (2013.01); *F16D 2300/14* (2013.01); *F16D 2300/18* (2013.01); *F16D 2500/1026* (2013.01); *F16D 2500/1045* (2013.01); *F16D 2500/10412* (2013.01); *F16D 2500/1117* (2013.01); *F16D 2500/3024* (2013.01)

(58) Field of Classification Search
CPC ....... F16D 2048/0266; F16D 2048/027; F16D 48/06; F16D 48/066; F16D 2300/14; F16D 2048/06; F16D 2048/066; F16D 2300/18; F16D 25/14; F16D 2500/1026; F16D 2500/10412; F16D 2500/1045; F16D 2500/1117; F16D 2500/3024
USPC ....................................................... 192/85.63
See application file for complete search history.

(56) References Cited

FOREIGN PATENT DOCUMENTS

| | | |
|---|---|---|
| DE | 10 2014 001 073 A1 | 7/2015 |
| FR | 3017914 A1 | 8/2015 |
| JP | S60-183232 A | 9/1985 |
| JP | 2013-210077 A | 10/2013 |

\* cited by examiner

HYDRAULIC SYSTEM

CROSS-REFERENCE TO RELATED APPLICATION

This application claims priority from Japanese Patent Application No. 2016-055458 filed on Mar. 18, 2016, the entire contents of which are incorporated herein by reference.

TECHNICAL FIELD

The present invention relates to a hydraulic system which controls a normally open-type clutch which connects or disconnects a power transmission line between an engine and a wheel.

BACKGROUND ART

In a related art, a normally open-type clutch which transmits power of an engine to a wheel maintains a connection between the engine and the wheel by supplying a hydraulic fluid from an oil pump which is driven by the engine of an electric oil pump to a hydraulic cylinder. In the case of the oil pump which is driven by the engine, with the clutch kept engaged, the oil pump needs to be kept operating, and a drive loss of the engine is generated accordingly, leading to a possibility of an increase in fuel consumption being called for. In the case of the electric oil pump, too, with the clutch kept engaged, the oil pump needs to be kept operating, and more electric power is consumed accordingly.

Patent literature 1 discloses a control unit for a normally open-type clutch. According to this clutch control unit, for example, in engaging a first clutch when a motorcycle is started from a standstill, the first clutch is engaged by supplying a hydraulic fluid which is discharged from an oil pump to a first hydraulic cylinder by activating an electric motor. While the first clutch is being engaged, a solenoid valve is closed, and the electric motor is stopped. Then, when a detection value of a first hydraulic pressure detector decreases below a first predetermined value while the first clutch is kept engaged, the electric motor is activated again, and a second regulator valve is controlled so that a detection value of a second hydraulic pressure detector reaches a second predetermined value which is higher than the first predetermined value, whereafter the operation of a first regulator valve is controlled with the solenoid valve opened. The clutch control unit is disclosed, that when the detection value of the first hydraulic pressure detector reaches a maximum value of a clutch holding pressure, the solenoid valve is closed and the electric motor is caused to stop operating, and the drive loss of the engine is reduced to attempt improving the fuel economy.

RELATED ART LITERATURE

Patent Literature

Patent Literature 1: JP-A-2013-210077

SUMMARY OF THE INVENTION

Problem that the Invention is to Solve

According to the technique described in patent literature 1, however, when a hydraulic pressure is recharged to increase the pressure of the first clutch which is decreased to the predetermined pressure, since the solenoid valve is opened, the second regulator valve on the upstream side is controlled in advance so that the pressure is not decreased. In addition, the first regulator valve is necessary to control again the supply of the hydraulic fluid so that the pressure of the first clutch becomes the predetermined pressure after the solenoid valve is opened. Thus, not only does the control become complex, but also the plurality of valves are required, leading to fears that higher equipment costs are called for.

An object of the invention is to provide a hydraulic system which enables to supply a hydraulic pressure to a hydraulic clutch with a simple configuration and which enables to resupply a steady hydraulic pressure.

Means for Solving the Problem

With a view to achieving the object, according to an invention of claim 1, there is provided a hydraulic system, including:

a normally open-type hydraulic clutch which connects or disconnects a power transmission line between an engine and a wheel;

an actuator which supplies a hydraulic pressure to the hydraulic clutch;

an oil flow path which connects the actuator to the hydraulic clutch;

a valve member which is provided on the oil flow path, and which enables to switch between an open state where the oil flow path communicates and a closed state where the oil flow path closes; and a hydraulic pressure sensor which is provided on the oil flow path, wherein the hydraulic system further includes a bypass flow path which bypasses the valve member, and wherein a one-way valve, which permits a supply of a hydraulic pressure from an actuator side to a hydraulic clutch side and which shuts off a supply of a hydraulic pressure from the hydraulic clutch side to the actuator side, is provided on the bypass flow path.

According to an invention of claim 2, in the invention of claim 1, the hydraulic pressure sensor is provided on a downstream side of the valve member.

According to an invention of claim 3, in the invention of claim 1, the hydraulic system further includes an accumulator on a downstream side of the valve member.

According to an invention of claim 4, in the invention of claim 1, the hydraulic system includes a control unit which controls the actuator and the valve member, and the control unit activates the actuator and opens the valve member to engage the hydraulic clutch, and thereafter stops the actuator and closes the valve member, activates the actuator while keeping the valve member closed to supply a hydraulic pressure to the hydraulic clutch side through the one-way valve when a detection value of the hydraulic pressure sensor provided on a downstream side of the valve member decreases below a predetermined hydraulic pressure with the hydraulic clutch kept engaged, and stops the actuator when a detection value of the hydraulic pressure sensor provided on the downstream side of the valve member reaches or exceeds the predetermined hydraulic pressure.

According to an invention of claim 5, in the invention of claim 1, the hydraulic system includes a control unit which controls the actuator and the valve member, and the control unit opens the valve member while keeping the actuator stopped to release a hydraulic pressure on the hydraulic clutch side when a detection value of the hydraulic pressure sensor provided on a downstream side of the valve member exceeds a further predetermined hydraulic pressure with the hydraulic clutch kept engaged, and closes the valve member when a detection value of the hydraulic pressure sensor provided on the downstream side of the valve member is less than the further predetermined hydraulic pressure.

According to an invention of claim 6, in the invention according to claim 5, the control unit opens the valve member in a step-by-step fashion.

Advantage of the Invention

According the invention of claim 1, when the hydraulic pressure on the hydraulic clutch side which lies downstream side of the valve member is decreased, since the hydraulic pressure can be increased with the valve member kept closed, a steady hydraulic pressure can be resupplied, and the hydraulic pressure resupply mechanism with the simple configuration can be realized.

According to the invention of claim 2, the resupply of hydraulic pressure and the stop of resupply of hydraulic pressure are determined based on the hydraulic pressure sensor provided on the downstream side of the valve member, and therefore, when compared with a case where the resupply of hydraulic pressure and the stop of resupply of hydraulic pressure are determined based on a hydraulic pressure sensor provided on an upstream side of the valve member, the pressure on the clutch side can be obtained without being affected by the pressure loss of the valve member, and the capacity of the clutch can be controlled accurately.

According to the invention of claim 3, a small variation in hydraulic pressure can be suppressed by the accumulator, the wasteful resupply and release of hydraulic pressure can be reduced, thereby making it possible to reduce consumed power.

According to the invention of claim 4, the hydraulic clutch is engaged by activating the actuator and opening the valve member, whereafter the actuator is stopped and the valve member is closed, so that the supply of hydraulic pressure from the hydraulic clutch side to the actuator side is shut off by the one-way valve, whereby the hydraulic pressure on the hydraulic clutch side which lies downstream of the valve member can be maintained, and the hydraulic clutch can be kept engaged.

In addition, when the hydraulic pressure on the downstream side of the valve member decreases below the predetermined hydraulic pressure with the hydraulic clutch kept engaged, the actuator is activated with the valve member kept closed, so that the hydraulic pressure is supplied to the hydraulic clutch side through the one-way valve, whereby a steady hydraulic pressure can be resupplied.

According to the invention of claim 5, when the hydraulic pressure on the downstream side of the valve member exceeds the further predetermined hydraulic pressure with the hydraulic clutch kept engaged, the valve member is opened with the actuator kept stopped to release the hydraulic pressure on the hydraulic clutch side, whereby it is possible to avoid a risk of the capacity of the clutch being increased more than required when the hydraulic pressure is raised by a rising temperature or the like.

According to the invention of claim 6, the valve member is opened step by step (gradually), whereby when compared with a case where the valve member is opened full through a single operation, the pressure on the downstream side (the clutch side) of the valve member can be controlled to the predetermined hydraulic pressure with stability.

MODE FOR CARRYING OUT THE INVENTION

Figure 1:
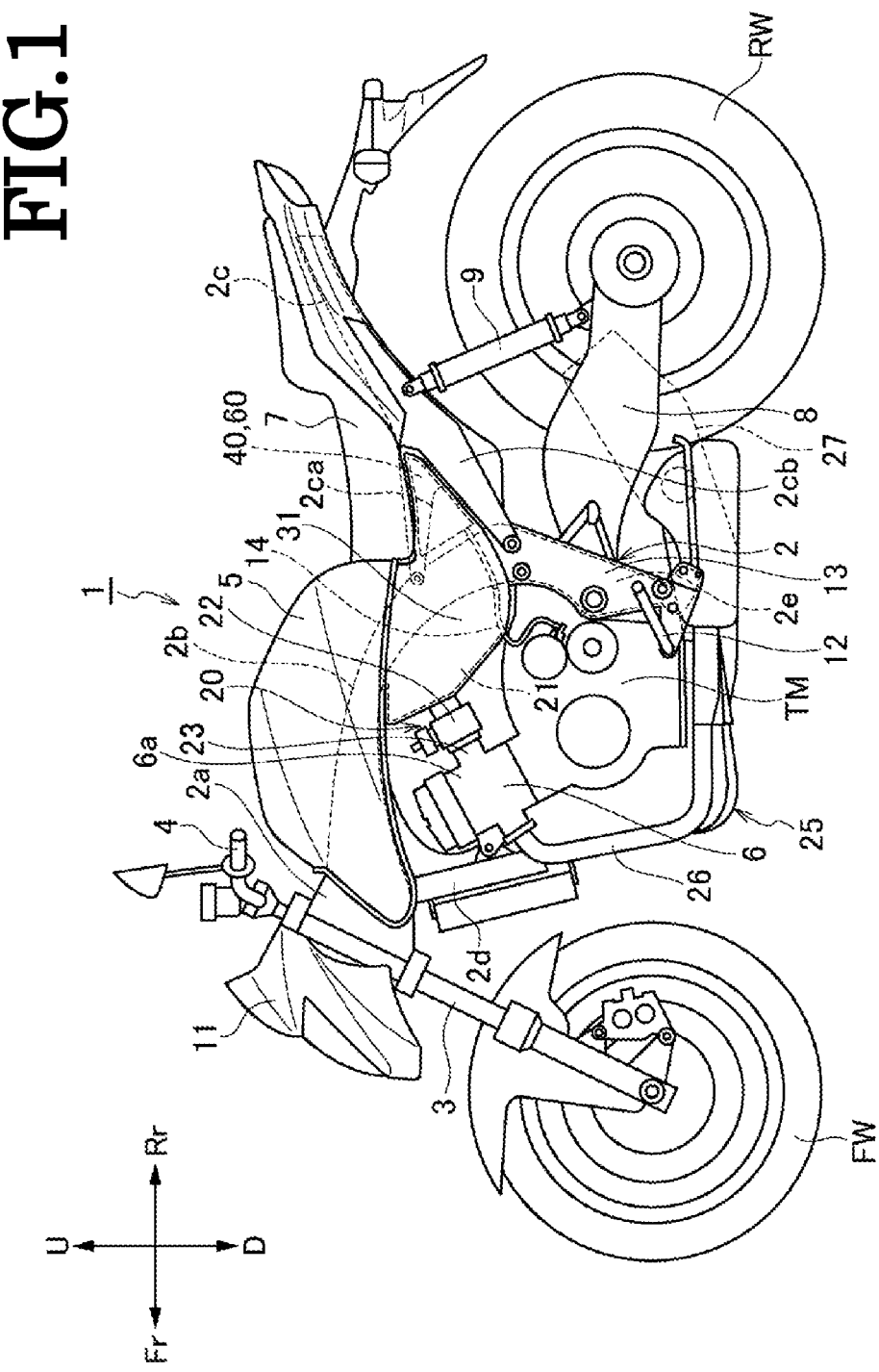
FIG. 1 is a schematic side view of a motorcycle which can install a hydraulic system according to the invention.

Hereinafter, an embodiment of the invention will be described based on the accompanying drawings below. The drawings should be seen in a direction in which given reference numerals look proper.

In FIG. 1, a body frame 2 of a riding type vehicle 1 which is a motorcycle includes a front fork 3 which supports a front wheel FW rotatably and a headstock 2a which supports a handlebar 4 so as to turn, a main frame 2b which extends rearwards and downwards from the headstock 2a, a pair of left and right sub-frames 2c which are provided continuously to the main frame 2b, a down frame 2d which is provided continuously to a front end portion of the main frame 2b and which extends rearwards and downwards at a steeper angle than the angle at which the main frame 2b extends rearwards and downwards, and a pivot frame 2e which is connected to a rear end portion of the main frame 2b. A drive unit made up of an engine 6 and a transmission TM is disposed at a lower portion of the main frame 2b and ahead of the pivot frame 2e.

This drive unit is mounded on the body frame 2 so as to be surrounded by the main frame 2b, the down frame 2d and the pivot frame 2e and is supported by a lower end portion of the down frame 2d and the pivot frame 2e. The power of the engine 6 is transmitted to a rear wheel RW which functions as a driven portion by way of a drive chain, not shown.

A fuel tank 5 is mounted above the engine 6 and on the main frame 2b, and a tandem-type seat 7 which is disposed at the rear of the fuel tank 5 is supported by the sub-frames 2c.

The sub-frames 2c have seat rail portions 2ca which are provided so as to continue to a middle portion of the main frame 2b at front end portions thereof and which extend to the rear from the main frame 2b and rear frame portions 2cb which extend forwards and downwards from middle portions of the seat rail portions 2ca in a front-and-rear direction so as to continue to the pivot frame 2e and are formed substantially into a Y-like shape when seen from a side.

A front end portion of a swing arm 8 which supports rotatably the rear wheel RW at a rear end portion thereof is supported on the pivot frame 2e so as to swing, and rear cushions 9 are provided individually between end portions of the left and right sub-frames 2c and the swing arm 8.

A front portion of the fuel tank 5 (a peripheral portion of a headlamp) is covered by a fairing 11 which is supported by a front portion of the body frame 2. A portion of the main frame 2b which extends from the middle portion which is situated below the fuel tank 5 to a rear end portion thereof and front portions of the sub-frames 2c are covered from both sides by a pair of left and right side covers 31. A left side surface of the pivot frame 2e is covered from a side by a change pedal stay 13 which supports a change pedal 12.

An intake system 20 is connected to a rear side surface of a cylinder head 6a, and this intake system 20 includes an air cleaner 21, a throttle body 22 which is connected to the air cleaner 21, and an intake pipe 23 which extends between the throttle body 22 and the cylinder head 6a to connect thereto. An exhaust system 25 is connected to a front side surface of the cylinder head 6a and includes an exhaust pipe 26 which extends from the front side surface of the cylinder head 6a to the rear after passing below the engine 6 and an exhaust muffler 27 which is disposed on a right-hand side of the rear wheel RW so as to extend obliquely upwards and rearwards to connect to a downstream end of the exhaust pipe 26.

Figure 2:
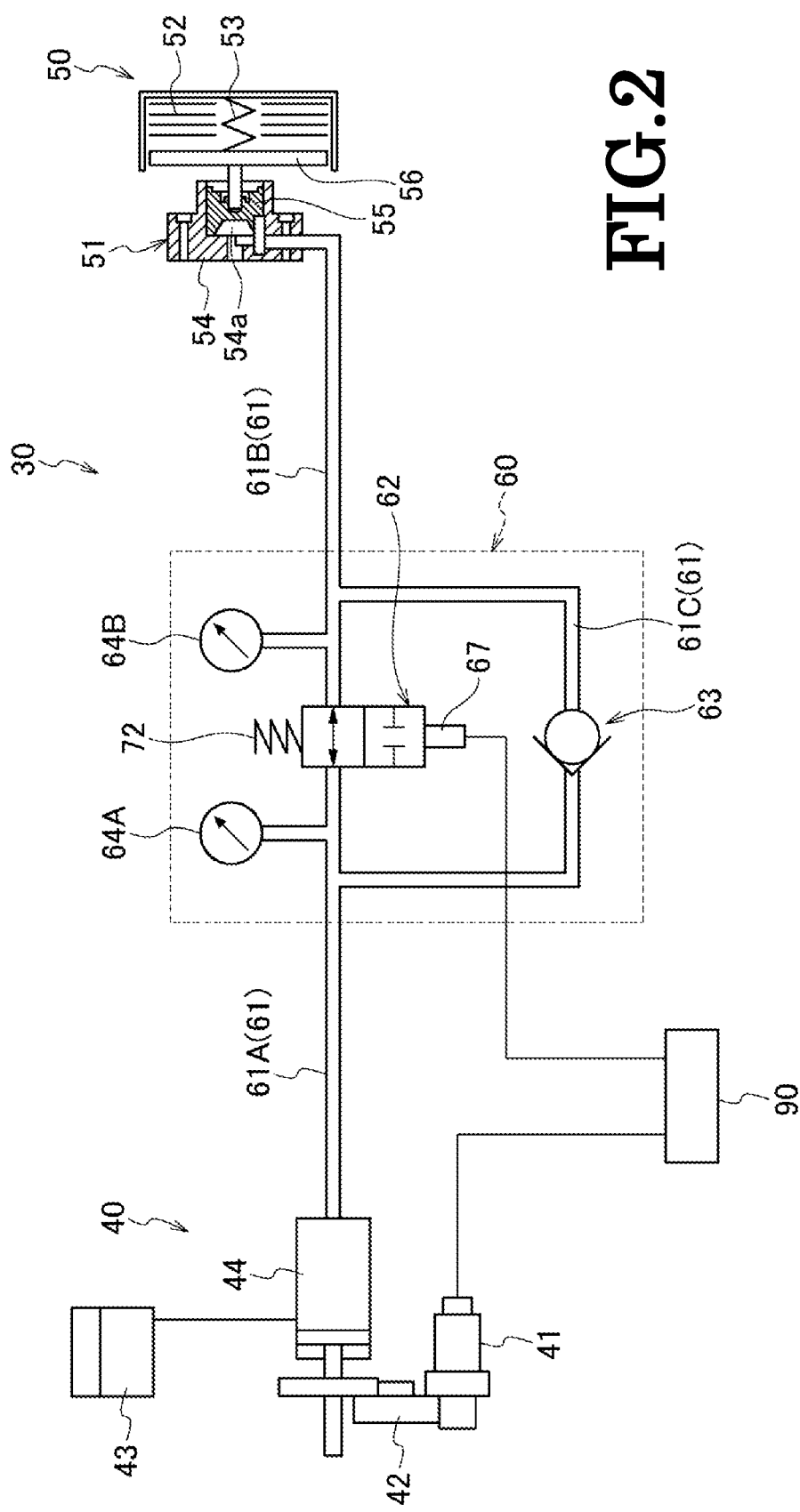
FIG. 2 is a circuit diagram of the hydraulic system which controls a hydraulic clutch.

FIG. 2 is a circuit diagram of a hydraulic system. A hydraulic system 30 of this embodiment includes a hydraulic actuator 40, a hydraulic clutch 50, an oil flow path 61 (61A, 61B, 61C) which connects the hydraulic actuator 40 to the hydraulic clutch 50, a valve unit 60 which is provided on the way of the oil flow path 61, and a control unit 90 (for example, an ECU) which controls the hydraulic actuator 40 and the valve unit 60. The hydraulic actuator 40 and the valve unit 60 are disposed between the sub-frames 2c under the seat 7, and the hydraulic clutch 50 is incorporated in the transmission TM. A hydraulic hose 14 which constitutes a downstream-side oil flow path 61B which connects a solenoid valve 62 to the hydraulic clutch 50 extends from under the seat 7 and connects to the transmission TM while passing through an inside of the side cover 31 above the change pedal stay 13.

The oil flow path 61 is made up of an upstream-side oil flow path 61A which lies closer to the hydraulic actuator 40 than the valve unit 60, the downstream-side oil flow path 61B which lies closer to the hydraulic clutch 50 than the valve unit 60 and a bypass flow path 61C which bypasses the solenoid valve 62 to connect the upstream-side oil flow path 61A to the downstream-side oil flow path 61B.

In the hydraulic actuator 40, an oil pump 42 which is driven by an electric motor 41 draws hydraulic fluid from a reservoir 43 and supplies the hydraulic fluid to the hydraulic clutch 50 through a master cylinder 44, the oil flow path 61 and the valve unit 60.

The hydraulic clutch 50 includes a hydraulic cylinder 51, a multiple-plate disc clutch 52, and an elastic member 53. The hydraulic cylinder 51 includes a cylinder 54 having a cylinder chamber 54a, a piston 55 which is fitted slidably in the cylinder chamber 54a and a pressure plate 56 which is fixed to the piston 55 to press the multiple-plate disc clutch 52.

The hydraulic clutch 50 is a normally open-type clutch. Normally, the pressure plate 56 is pressed by means of an elastic force of the elastic member 53 (to the left in the figure), whereby the hydraulic clutch 50 is kept in a non-applied state, shutting off the power transmission line between the engine 6 and the rear wheel RW. In addition, as a result of the hydraulic pressure being supplied from the hydraulic actuator 40 to the cylinder chamber 54a of the hydraulic cylinder 51, the piston 55 moves together with the pressure plate 56 (in the rightward direction in the figure), putting the hydraulic clutch 50 in an applied state, whereby the power transmission line is connected between the engine 6 and the rear wheel RW.

Figure 3:
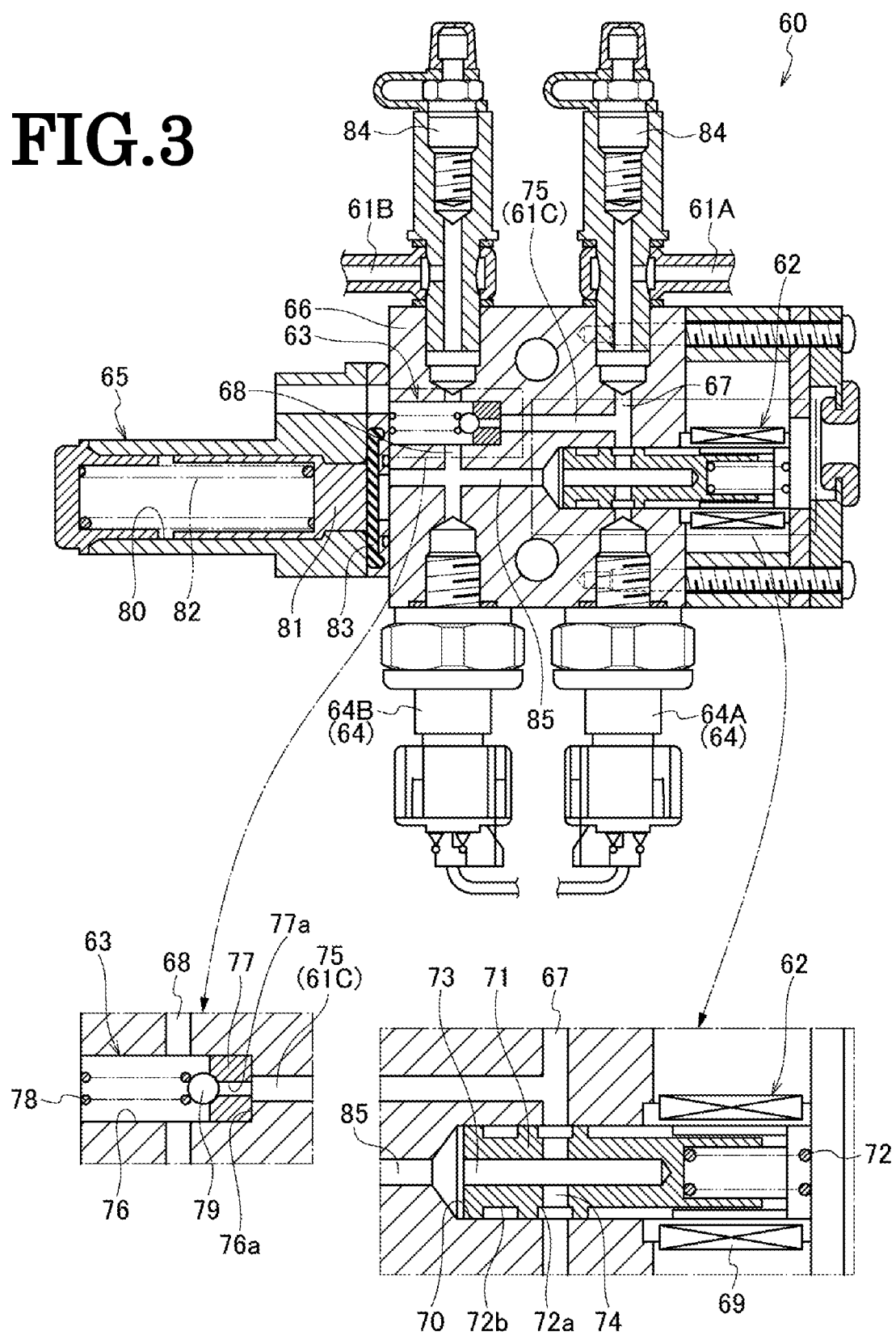
FIG. 3 is a sectional view of a valve unit.

Referring to FIG. 3, too, the valve unit 60 is unitized by mounting or incorporating the normally open-type solenoid valve 62, a one-way valve 63, a hydraulic pressure sensor 64 (64A, 64B), and an accumulator 65 in a case member 66.

A first communication hole 67 and a second communication hole 68, which penetrate in a vertical direction in FIG. 3, are provided in the case member 66. The first communication hole 67 communicates with the master cylinder 44 through the upstream-side oil flow path 61A, and the second communication hole 68 communicates with the hydraulic cylinder 51 through the downstream-side oil flow path 61B. Namely, the first communication hole 67 makes up part of the upstream-side flow path 61A, and the second communication hole 68 makes up part of the downstream-side oil flow path 61B. The first communication hole 67 and the second communication hole 68 communicate with each other through a connecting hole 85 which is formed horizontally in the figure.

The solenoid valve 62 includes a spool 71 which is fitted slidably in a spool chamber 70 which is formed by widening in diameter a first communication hole 67 side of the connecting hole 85, a solenoid spring 72 which is a biasing member which biases the spool 71 in one direction (in a leftward direction in FIG. 3) by means of its elastic force, and a solenoid 69 which is fixed to the case member 66 and which receives electric power supplied through a cable, not shown, to be excited to thereby move the spool 71 in an axial direction (in a rightward direction in FIG. 3).

Two annular grooves 72a, 72b are formed on an outer circumferential surface of the spool 71 so as to be spaced away from each other in the axial direction. The two annular grooves 72a, 72b are provided in positions which come to match with the first communication hole 67 in a non-operating position where the spool 71 moves in the leftward direction in the figure by means of the elastic force of the solenoid spring 72 and in an operating position where the spool 71 moves in the rightward direction in the figure by means of an electromagnetic force of the solenoid 69.

The spool 71 has a closed-end hole 73 which is formed axially along an axial center and a radial hole 74 which is formed radially so as to establish a communication between the annular groove 72a and the closed-end hole 73. The closed-end hole 73 does not communicate with the annular groove 72b and is hence cut off from the annular groove 72b.

When the solenoid 69 is normally not excited, since the spool 71 is moved in the leftward direction by means of the elastic force of the solenoid spring 72, the solenoid valve 62 is in an opened state where the first communication hole 67, the radial hole 74, the closed-end hole 73, the connecting hole 85 and the second communication hole 68 communicate, whereby the upstream-side oil flow path 61A is caused to communicate with the downstream-side oil flow path 61B.

Then, when electric power is supplied to the solenoid 69, the spool 71 moves in the axial direction (in the rightward direction in FIG. 3) inside the spool chamber 70 to a position where the annular groove 72b matches with the first communication hole 67 against the elastic force of the solenoid spring 72, whereby the solenoid valve 62 is closed, and the communication between the upstream-side oil flow path 61A and the downstream-side oil flow path 61B is shut off.

In the case member 66, a communication path 75 is formed substantially parallel to the connecting hole 85, and this communication path 75 establishes a communication between the first communication hole 67 and the second communication hole 68. The communication path 75 makes up the bypass flow path 61C which bypasses the solenoid valve 62 to connect the upstream-side oil flow path 61A (the first communication hole 67) and the downstream-side oil flow path 61B (the second communication hole 68).

A second communication hole 68 side of the communication path 75 is widened in diameter to form a valve chamber 76 for the one-way valve 63. A valve seat 77 having an interior flow path 77a is provided in a step portion 76a of the valve chamber 76, and a valve body 79 is normally brought into abutment with the valve seat 77 by means of an elastic force of a valve spring 78, whereby the one-way valve 63 is kept closed.

When a pressure inside the upstream-side oil flow path 61A becomes higher than a pressure inside the downstream-side oil flow path 61B, the valve body 79 is caused to move away from the valve seat 77 against the elastic force of the valve spring 78, whereby the one-way valve 63 is opened, and this permits a supply of hydraulic pressure from a hydraulic actuator 40 side to a hydraulic clutch 50 side. When the pressure inside the upstream-side oil flow path 61A becomes lower than the pressure inside the downstream-side oil flow path 61B, the valve body 79 is brought into abutment with the valve seat 77 by means of the elastic force of the valve spring 78, whereby the one-way valve 63 is closed, and this shuts off a supply of hydraulic pressure from the hydraulic clutch 50 side to the hydraulic actuator 40 side.

An upstream-side hydraulic pressure sensor 64A is attached to the first communication hole 67. When allowed to communicate with either of the two annular grooves 72a, 72b which are provided on the spool 71, the upstream-side hydraulic pressure sensor 64A can measure a pressure in the upstream-side oil flow path 61A which lies upstream of the solenoid valve 62. A downstream-side hydraulic pressure sensor 64B is attached to the second communication hole 68. The downstream-side hydraulic pressure sensor 64B can measure a pressure in the downstream-side oil flow path 61B which lies downstream of the solenoid valve 62. The accumulator 65 is provided downstream of the solenoid valve 62 in the connecting hole 85.

The accumulator 65 is made up of a piston 81 which fits slidably in an accumulator chamber 80, a coil spring 82 which biases the piston 81 in a direction in which the piston 81 is pushed out of the accumulator chamber 80, and a diaphragm 83 which isolates the accumulator chamber 80 from the connecting hole 85. When a pressure in the downstream-side oil flow path 61B is raised, the accumulator 65 pushes the piston 81 via the diaphragm 83 against an elastic force of the coil spring 82 so as to accumulate a hydraulic pressure in the accumulator chamber 80. When the pressure in the downstream-side oil flow path 61B is lowered, the accumulator 65 discharges the hydraulic pressure from the accumulator chamber 80 so as to suppress a variation in pressure in the downstream-side oil flow path 61B. In the figure, reference numeral 84 denotes an air bleeding bleeder bolt.

Next, referring to FIGS. 4 to 10, the operation of the hydraulic system will be described. It should be noted that lines having different thicknesses are selectively used to match hydraulic pressures of different magnitudes. An oil flow path on which a high hydraulic pressure is exerted is indicated by a thick line, and an oil flow path on which a low hydraulic pressure is exerted is indicated by a thin line. An oil flow path on which a hydraulic pressure intermediate between the high and low hydraulic pressures is exerted is indicated by a line having a thickness intermediate between the thick and thin lines.

Figure 4:
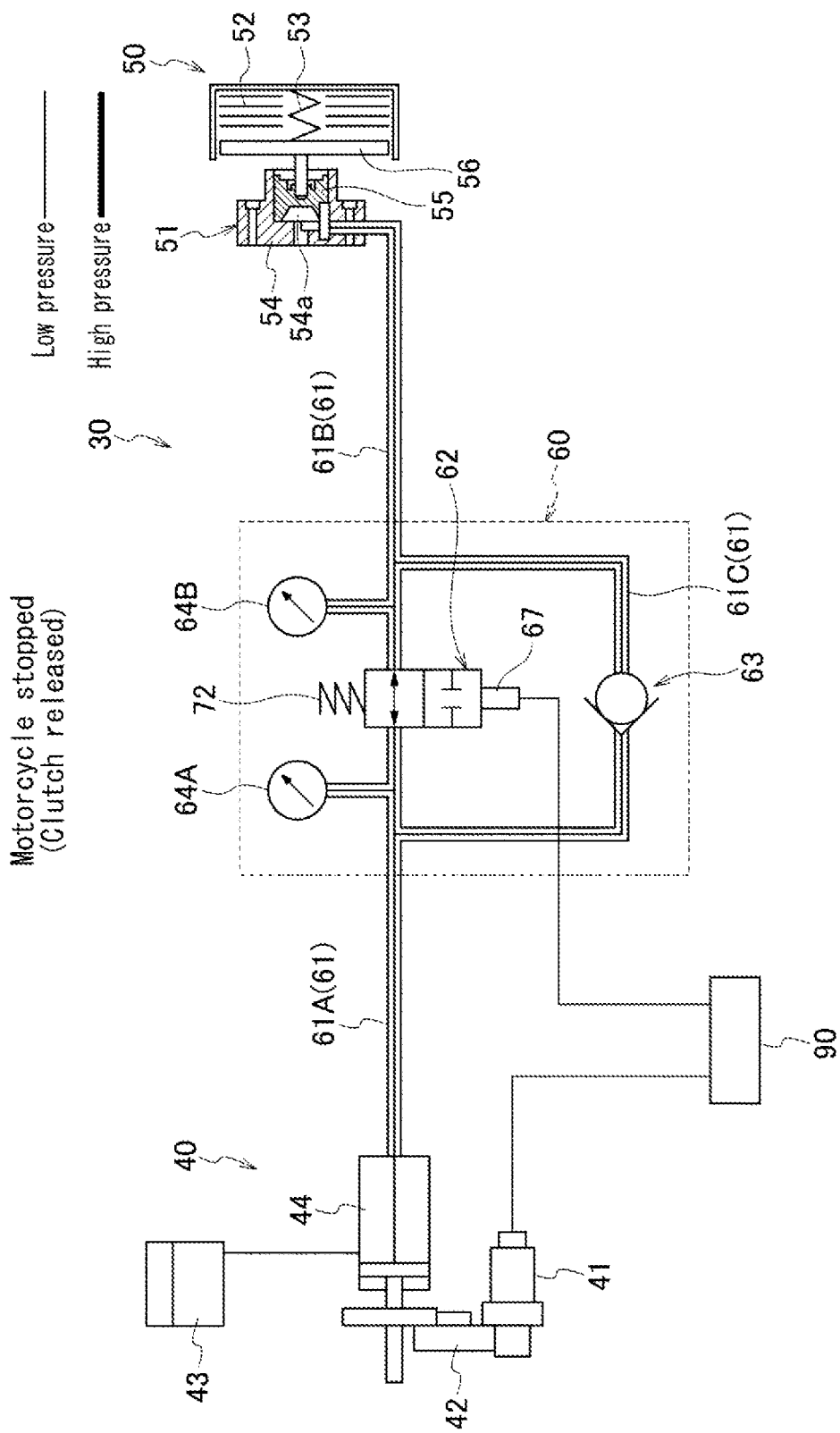
FIG. 4 is a schematic block diagram of the hydraulic system while the motorcycle is stopped (a hydraulic clutch is released).

When the motorcycle 1 is stopped (idling), as shown in FIG. 4, a supply of electric power to the electric motor 41 and the solenoid valve 62 which are controlled by the control unit 90 is shut off. Consequently, the hydraulic actuator 40 generates no hydraulic pressure. In addition, since the solenoid valve 62 is opened, a pressure which is lower than a touch point hydraulic pressure TP is being generated in the cylinder chamber 54a of the hydraulic cylinder 51, whereby the hydraulic clutch 50 is kept in a non-applied state (the clutch is released). This state corresponds to an area A in FIG. 10.

Figure 5:
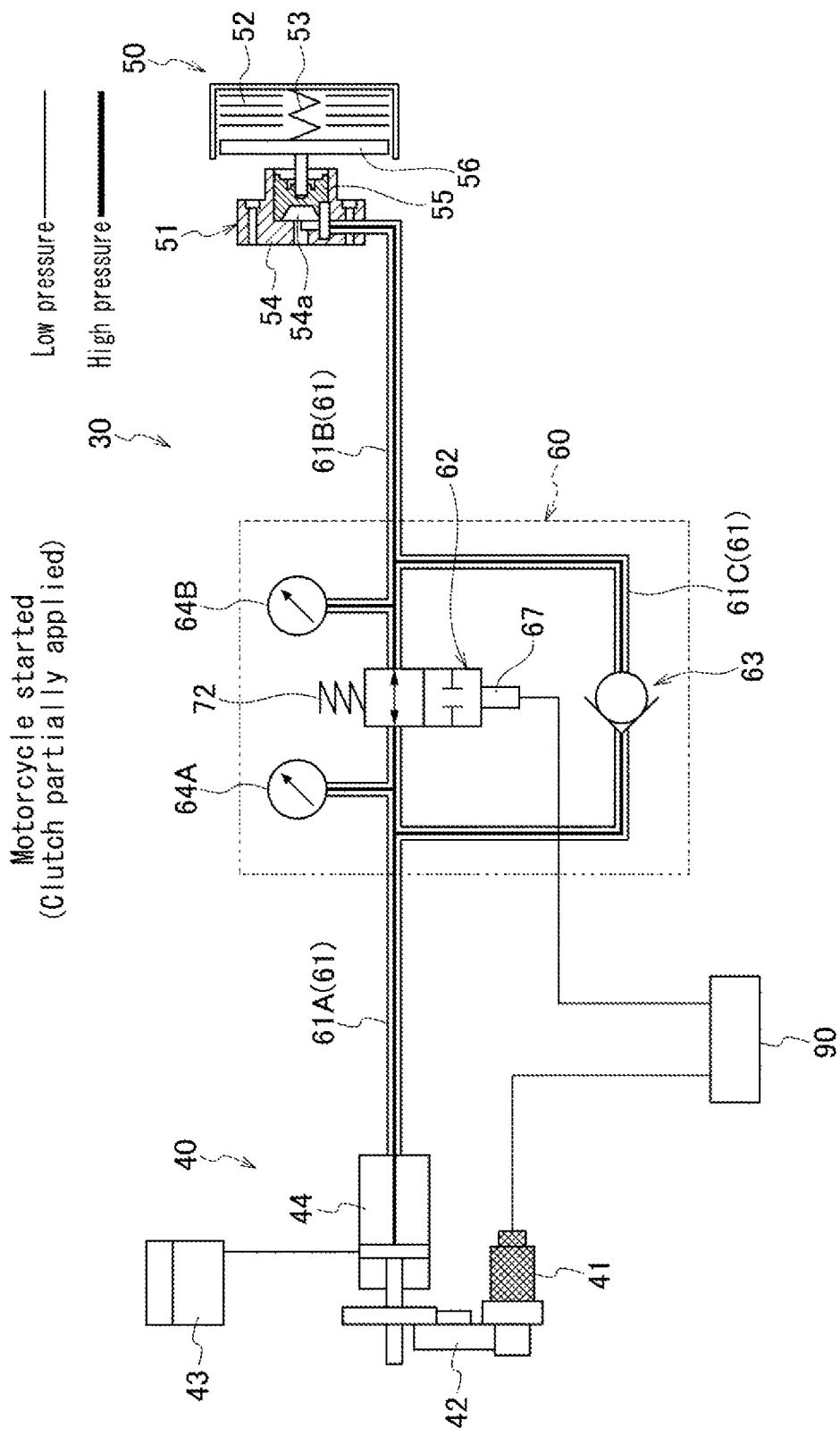
FIG. 5 is a schematic block diagram of the hydraulic system when the motorcycle is started from a standstill (the hydraulic clutch is partially applied).

As shown in FIG. 5, when the revolution speed of the engine 6 is raised to start the motorcycle 1, electric power is supplied to the electric motor 41, activating the oil pump 42. The oil pump 42 draws a hydraulic fluid from the reservoir 43 to supply a hydraulic pressure to the hydraulic cylinder 51 through the solenoid valve 62 which is opened. When a pressure at the downstream-side hydraulic pressure sensor 64B, that is, a pressure inside the cylinder chamber 54a of the hydraulic cylinder 51 is raised to the touch point hydraulic pressure TP or higher, the pressure plate 56 presses against the multiple-plate disc clutch 52 against the elastic force of the elastic member 53, starting an application of the hydraulic clutch 50.

The pressure of the hydraulic fluid which is supplied to the hydraulic cylinder 51 can be controlled by controlling the revolution speed of the oil pump 42 in proportion to the revolution speed of the engine 6 or the position of a throttle valve. The motorcycle 1 can be started smoothly after the hydraulic clutch 50 is partially applied (a so-called partial clutch engagement). This state corresponds to an area B in FIG. 10.

Figure 6:
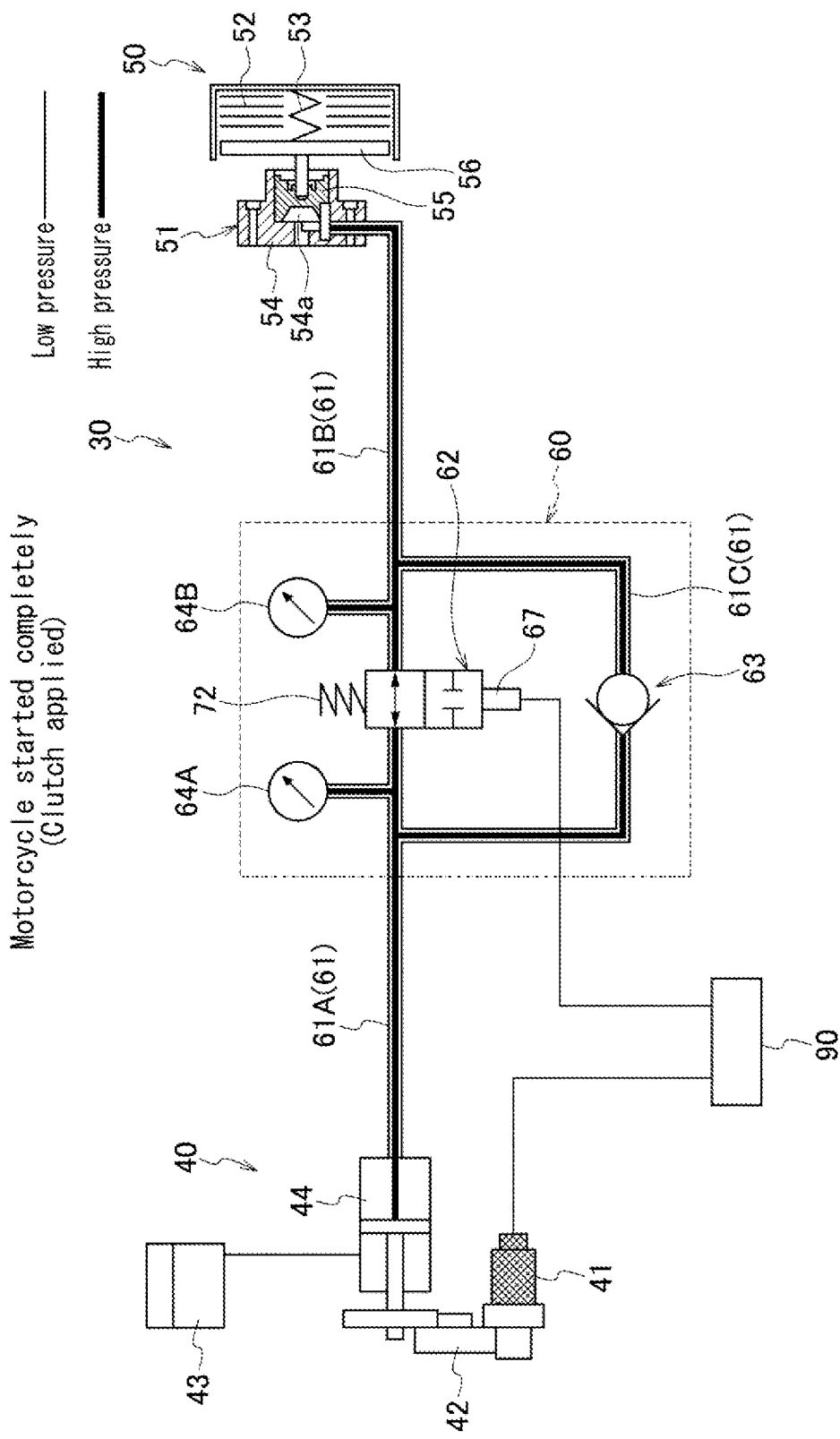
FIG. 6 is a schematic block diagram of the hydraulic system when the motorcycle is started completely (the hydraulic clutch is applied).

As shown in FIG. 6, when the pressure inside the cylinder chamber 54a of the hydraulic cylinder 51 reaches a lower limit holding hydraulic pressure LP, the multiple-plate disc clutch 52 is pressed against by the pressure plate 56 until clutch plates contact each other completely, whereby the application of the hydraulic clutch 50 is completed. This state corresponds to an area C in FIG. 10.

Figure 7:
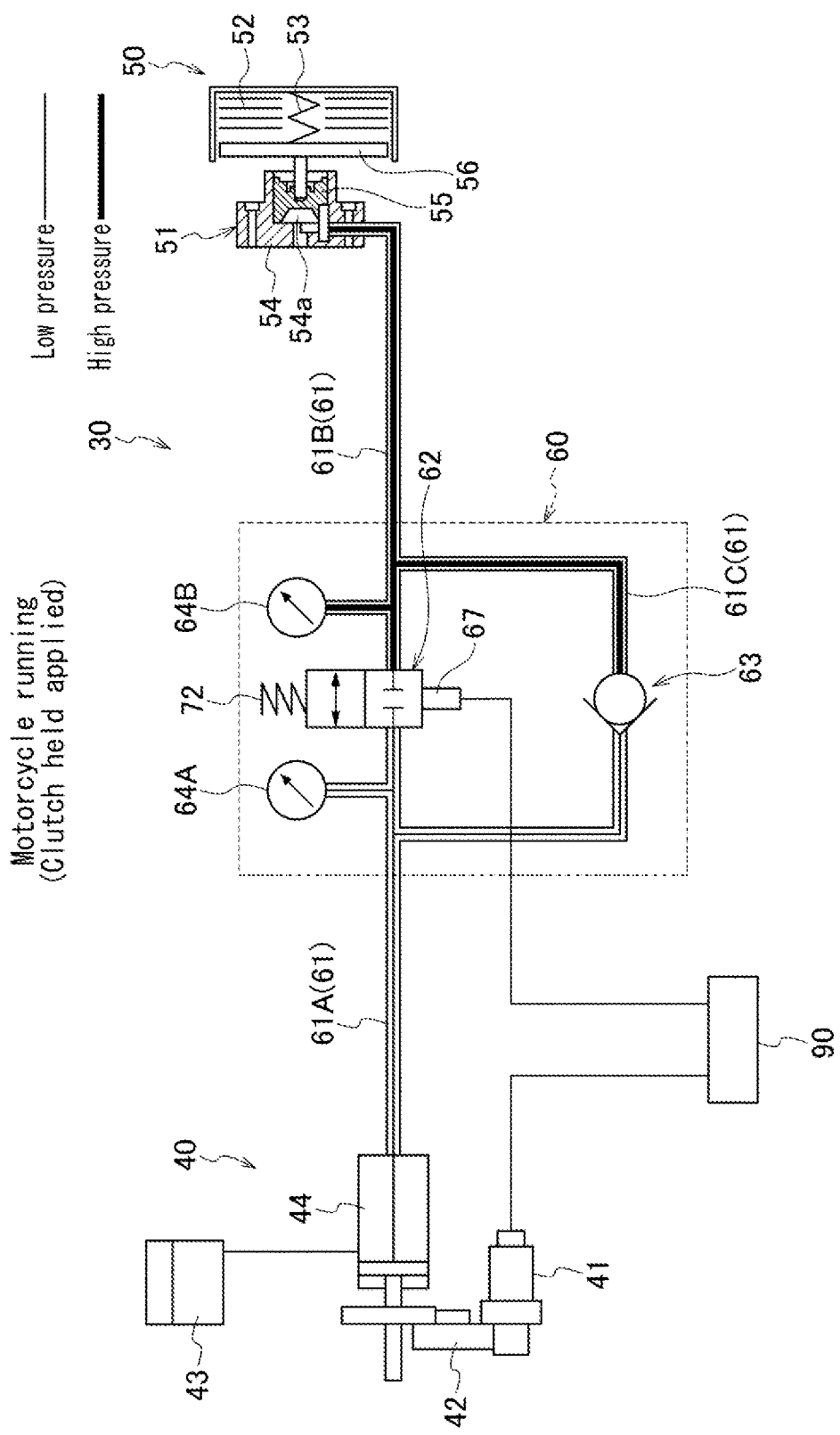
FIG. 7 is a schematic block diagram of the hydraulic system while the motorcycle is running (the hydraulic clutch is applied and so held).

Then, when the pressure inside the cylinder chamber 54a of the hydraulic cylinder 51 reaches an upper limit holding hydraulic pressure HP, that is, the downstream-side hydraulic pressure sensor 64B detects an upper limit holding hydraulic pressure HP, as shown in FIG. 7, the control unit 90 energizes the solenoid 69 of the solenoid valve 62 to close the solenoid valve 62. Additionally, the control unit 90 shuts off the supply of electric power to the electric motor 41 to stop the oil pump 42. Consequently, the pressure in the upstream-side oil flow path 61A is decreased to a low pressure.

By doing so, the downstream-side oil flow path 61B which connects the valve unit 60 to the hydraulic cylinder 51 is cut off from the hydraulic actuator 40 side by the solenoid valve 62 which is closed and the one-way valve 63 which shuts off the supply of hydraulic pressure from the hydraulic clutch 50 side to the hydraulic actuator 40 side, whereby the pressure inside the cylinder chamber 54a of the hydraulic cylinder 51 is kept high (the upper limit holding hydraulic pressure HP). Namely, the hydraulic clutch 50 is kept applied without receiving the supply of hydraulic pressure from the oil pump 42, whereby the motorcycle 1 can be ridden to run. This reduces the drive loss of the engine 6 while the motorcycle 1 is running.

Figure 8:
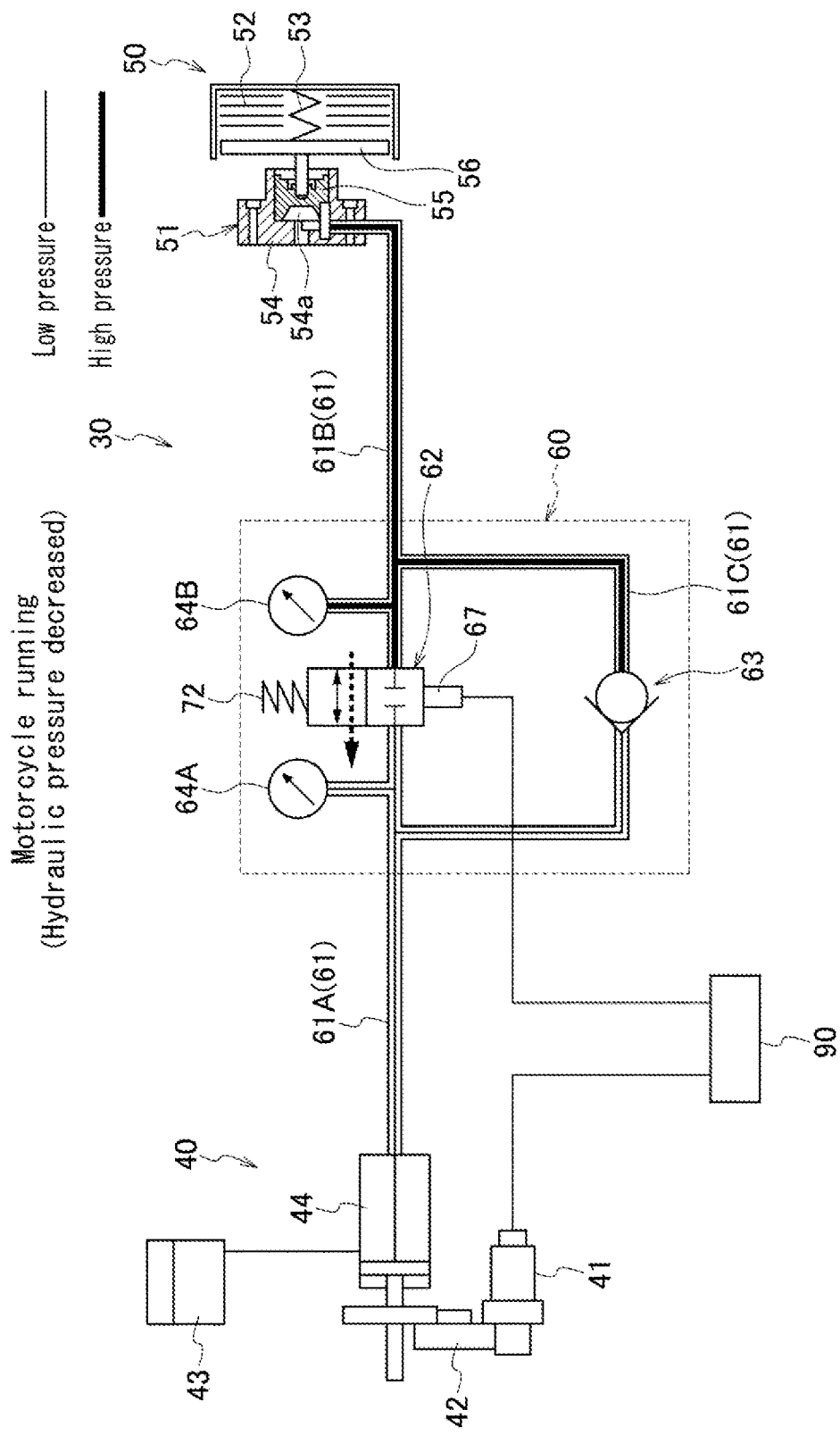
FIG. 8 is a schematic block diagram of the hydraulic system while the motorcycle is running (the hydraulic pressure of the hydraulic clutch is decreased).

As shown in FIG. 8, the pressure inside the cylinder chamber 54a of the hydraulic cylinder 51 is held by the solenoid valve 62 which is closed and the one-way valve 63 while the motorcycle 1 is running, and the hydraulic clutch 50 is kept applied. However, there is a situation where the pressure inside the cylinder chamber 54a decreases gradually as shown by an area D in FIG. 10 due to a hydraulic pressure leakage resulting from deformed seals of the solenoid valve 62 and the one-way valve 63 or a reduction in temperature. Additionally, as shown by an area E in FIG. 10, there is also a situation where the pressure inside the cylinder chamber 54a is raised by an increase in temperature.

These fine variations in pressure inside the downstream-side oil flow path 61B are absorbed by the accumulator 65 as a result of the piston 81 sliding inside the accumulator chamber 80. This obviates the necessity of the hydraulic actuator 40 being activated to operate wastefully every time a fine variation in pressure occurs inside the downstream-side oil flow path 61B, thereby making it possible to reduce consumed power.

Figure 10:
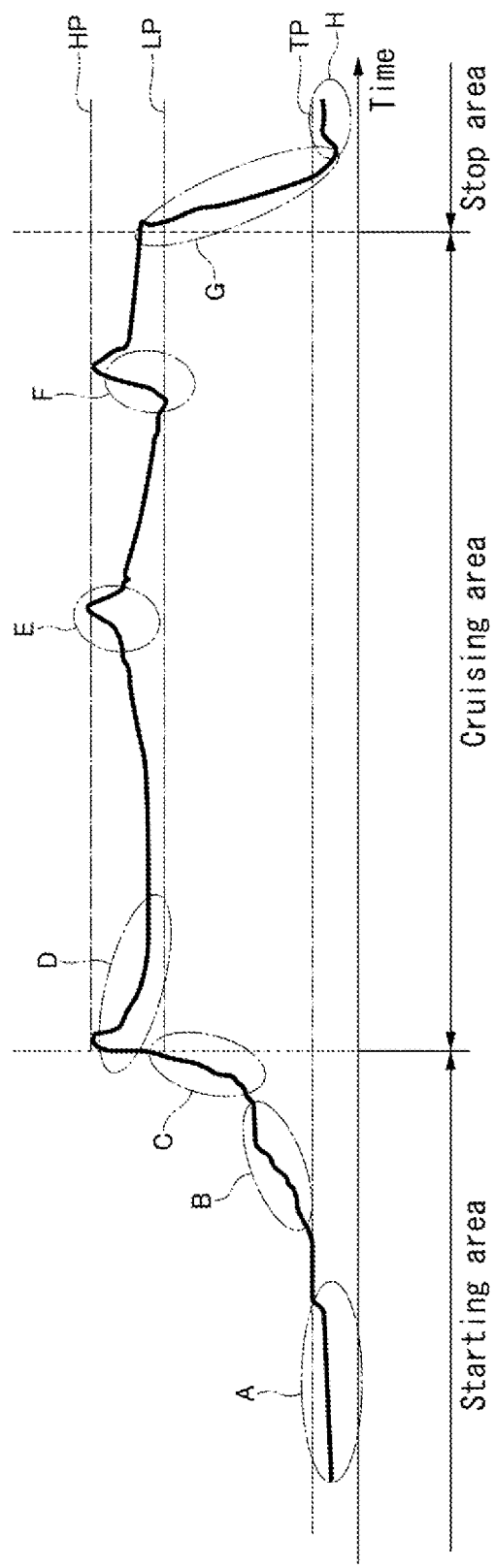
FIG. 10 is a graph showing a change in hydraulic pressure of the hydraulic clutch with time which is controlled according to the running conditions of the motorcycle.

As shown by the area E in FIG. 10, when the pressure inside the cylinder chamber 54a is raised to the upper limit holding hydraulic pressure HP due to an increase in temperature or the like, the supply of electric power to the solenoid 69 of the solenoid valve 62 is decreased or the energizing of the solenoid 69 is stopped for a short period of time, so that the solenoid valve 62 is opened step by step to thereby relieve the hydraulic pressure of the downstream-side oil flow path 61B. Since the magnitude of electromagnetic force generated by the solenoid 69 is substantially proportional to electric power supplied thereto, the relieved pressure can be controlled by electric power supplied to the solenoid valve 62.

Figure 9:
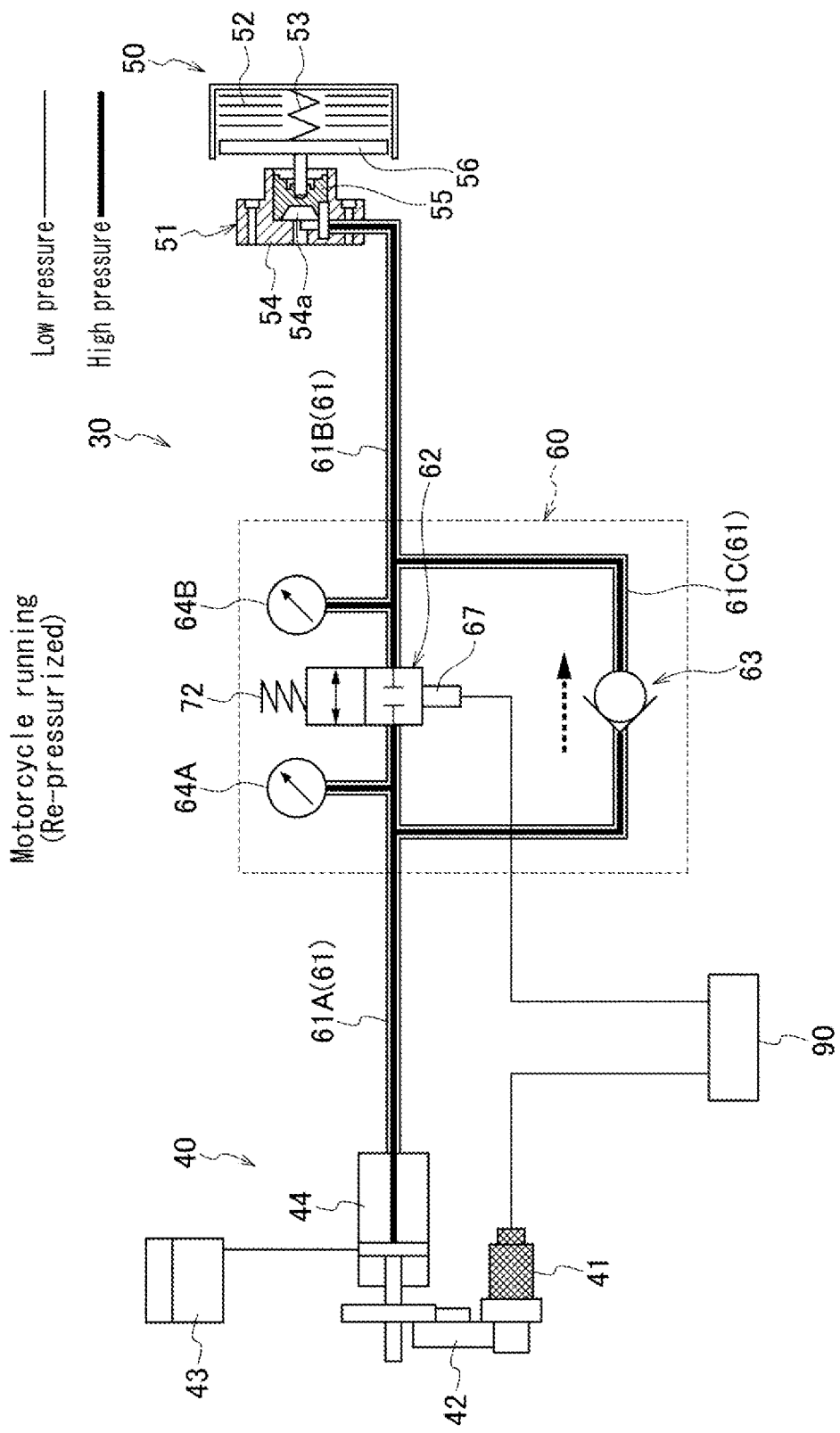
FIG. 9 is a schematic block diagram of the hydraulic system while the motorcycle is running (the hydraulic clutch is re-pressurized).

As shown by an area F in FIG. 10, when the pressure inside the cylinder chamber 54a of the hydraulic cylinder 51 is decreased to the lower limit holding hydraulic pressure LP, the downstream-side hydraulic pressure sensor 64B detects the lower limit holding hydraulic pressure LP, and the control unit 90 starts the supply of electric power to the electric motor 41 to activate the oil pump 42 while keeping the solenoid valve 62 closed, as shown in FIG. 9.

A hydraulic pressure supplied from the oil pump 42 is supplied then to the downstream-side oil flow path 61B through the bypass flow path 61C and the one-way valve 63 to re-pressurize the hydraulic cylinder 51. Then, when the downstream-side hydraulic pressure sensor 64B detects the upper limit holding hydraulic pressure HP, the control unit 90 stops the rotation of the electric motor 41. By doing so, the hydraulic pressure inside the cylinder chamber 54a of the hydraulic cylinder 51 is held between the lower limit holding hydraulic pressure LP and the upper limit holding hydraulic pressure HP, whereby the hydraulic clutch 50 is kept applied.

When the motorcycle 1 is stopped, the control unit 90 shuts off the supply of electric power to the electric motor 41 and the solenoid valve 62 as shown in FIG. 4. By doing so, the operation of the oil pump 42 is stopped, and the supply of hydraulic pressure to the hydraulic cylinder 51 is stopped. Since the electromagnetic force of the solenoid 69 of the solenoid valve 62 is lost, the solenoid valve 62 is opened, and the pressure inside the cylinder chamber 54a of the hydraulic cylinder 51 is decreased to the touch point hydraulic pressure TP or lower, whereby the hydraulic clutch 50 is put in the non-applied state. This state corresponds to areas G, H in FIG. 10.

Thus, as has been described heretofore, since the hydraulic system 30 of this embodiment includes the hydraulic clutch 50, the hydraulic actuator 40 which supplies the hydraulic pressure to the hydraulic clutch 50, the solenoid valve 62 which is provided on the oil flow path 61 and which can be switched between the opened state where the solenoid valve 62 establishes a communication in the oil flow path 61 and the closed state where the solenoid valve 62 closes the oil flow path 61, the hydraulic pressure sensor 64, the bypass flow path 61C which bypasses the solenoid valve 62, and the one-way valve 63 which is provided on the bypass flow path 61C and which permits the supply of hydraulic pressure from the hydraulic actuator 40 side to the hydraulic clutch 50 side and shuts off the supply of hydraulic pressure in the opposite direction, when the hydraulic pressure on the hydraulic clutch 50 side is decreased, the hydraulic pressure so decreased can be raised while keeping the solenoid valve 62 closed, and a steady hydraulic pressure can be resupplied. Thus, the hydraulic pressure resupplying mechanism can be realized with the simple configuration.

Since the accumulator 65 is provided further on the downstream side of the solenoid valve 62, the fine variations in hydraulic pressure can be suppressed by the accumulator 65, and the wasteful resupply and release of hydraulic pressure can be reduced, thereby making it possible to reduce consumed power.

The control unit 90 activates the hydraulic actuator 40 and opens the solenoid valve 62 to thereby engage the hydraulic clutch 50. Thereafter, the control unit 90 stops the hydraulic actuator 40 and closes the solenoid valve 62 to thereby maintain the hydraulic pressure on the downstream side of the solenoid valve 62, whereby the hydraulic clutch 50 can be kept engaged.

When a detection value of the hydraulic pressure sensor 64B which is provided on the downstream side of the solenoid valve 62 decreases below the lower limit holding hydraulic pressure LP with the hydraulic clutch 50 kept engaged, the control unit 90 activates the hydraulic actuator 40 while keeping the solenoid valve 62 closed so as to supply a hydraulic pressure to the hydraulic clutch 50 side through the one-way valve 63. When a detection value of the hydraulic pressure sensor 64B which is provided on the downstream side of the solenoid valve 62 reaches or exceeds the lower limit holding hydraulic pressure LP, the control unit 90 stops the hydraulic actuator 40. By doing so, since the hydraulic pressure on the downstream side of the solenoid valve 62 can be increased with the solenoid valve 62 kept closed, a steady hydraulic pressure can be resupplied. Thus, the hydraulic pressure resupply mechanism can be realized with the simple configuration.

When a detection value of the hydraulic pressure sensor 64B which is provided on the downstream side of the solenoid valve 62 exceeds the upper limit holding hydraulic pressure HP with the hydraulic clutch 50 kept engaged, the control unit 90 opens the solenoid valve 62 while keeping the hydraulic actuator 40 stopped to thereby release the hydraulic pressure on the hydraulic clutch 50 side. When a detection value of the hydraulic pressure sensor 64B which is provided on the downstream side of the solenoid valve 62 becomes less than the upper limit holding hydraulic pressure HP, the control unit 90 closes the solenoid valve 62. By doing so, it is possible to avoid a risk of the capacity of the clutch being raised higher than required when the hydraulic pressure is raised by an increase in temperature or the like.

In this embodiment, the resupply of hydraulic pressure and the stop of resupply of hydraulic pressure are determined based on the downstream-side hydraulic pressure sensor 64B which is provided downstream side of the solenoid valve 62. Thus, when compared with a case where the resupply of hydraulic pressure and the stop of resupply of hydraulic pressure are determined based on the upstream-side hydraulic pressure sensor 64A which is provided upstream side of the solenoid valve 62, the pressure on the hydraulic clutch 50 side can be obtained without being affected by the pressure loss of the solenoid valve 62, whereby the clutch capacity can be controlled accurately.

The control unit 90 opens the solenoid valve 62 step by step (gradually). Thus, when compared with a case where the solenoid valve 62 is opened full through a single operation, a drastic increase in pressure on the upstream side of the solenoid valve 62 can be suppressed, the pressure on the downstream side (the hydraulic clutch 50 side) of the solenoid valve 62 can be controlled to the predetermined hydraulic pressure with stability.

The invention is not limited to the embodiment that has been described above and hence can be modified or improved as required. While the motorcycle is described as being the vehicle to which the invention is applied, the invention is not limited thereto.

Figure 11:
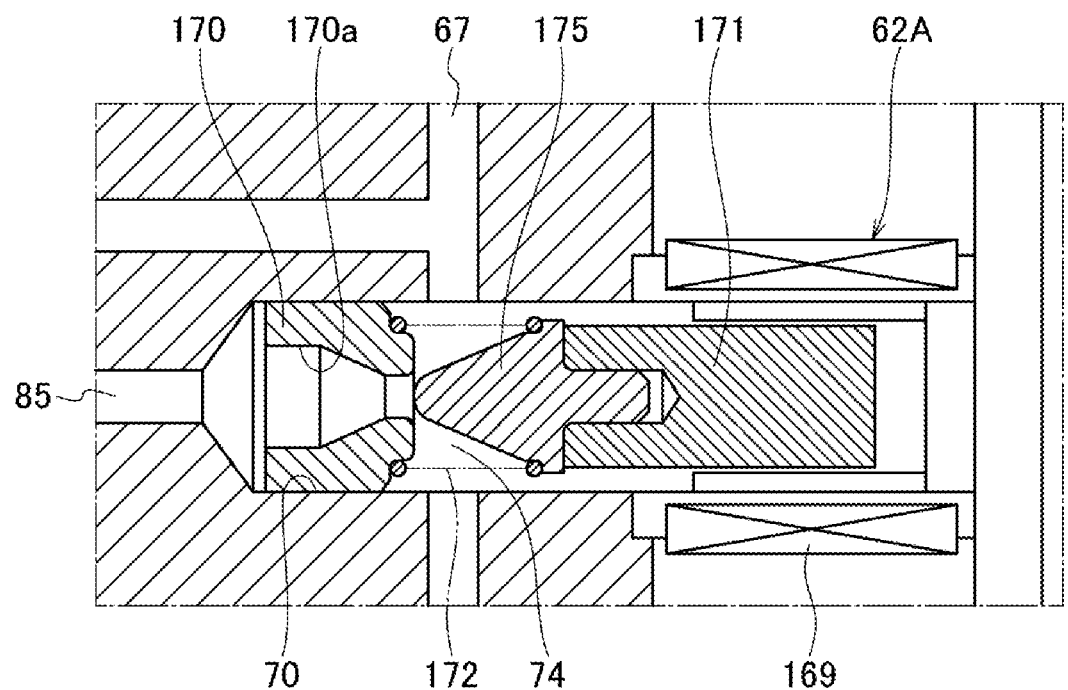
FIG. 11 is a sectional view of a solenoid valve according to a modified example.

The solenoid valve 62 is not limited to the one described in the embodiment and hence may take the form of a solenoid valve 62A shown in FIG. 11, for example. Hereinafter, referring to FIG. 11, the solenoid valve 62A according to a modified example will be described.

The solenoid valve 62A is fixed in place in a spool chamber 70 which is formed by widening in diameter a first communication hole 67 side of a connecting hole 85 and includes a valve seat 170 having an interior flow path 170a, a solenoid spring 172 which is a biasing member which biases a valve body 175 in a direction in which the valve body 175 moves away from the valve seat 170 (in a rightward direction in FIG. 11) by means of its elastic force, a spool 171 which holds the valve body 175, and a solenoid 169 which is fixed to the case member 66 and which receives electric power supplied via a cable, not shown, to be excited to thereby move the spool 171 in a direction in which the spool 171 moves towards the valve seat 170 (in a leftward direction in FIG. 3).

When the solenoid 169 is not normally excited, in the solenoid valve 62A, since the valve body 175 is biased in the direction in which the valve body 175 moves away from the valve seat 170 by means of the elastic force of the solenoid spring 172, a first communication hole 67, a radial hole 74, the interior flow path 170a, the connecting hole 85 and a second communication hole 68 are opened to communicate with each other, whereby an upstream-side oil flow path 61A and a downstream-side oil flow path 61B are caused to communicate with each other.

Then, when electric power is supplied to the solenoid 169, in the solenoid valve 62A, the spool 171 moves the valve body 175 in a direction in which the valve body 175 moves towards the valve seat 170 against the elastic force of the solenoid spring 172, whereby the solenoid valve 62A is closed in which the valve body 175 closes the interior flow path 170a. Thus, the communication between the upstream-side oil flow path 61A and the downstream-side oil flow path 61B is shut off.

In the embodiment and the modified example, while the normally open-type solenoid valves 62, 62A are described as constituting the valve member, a normally closed-type solenoid valve may be used as the valve member.

DESCRIPTION OF REFERENCE NUMERALS AND CHARACTERS

6 Engine
10 Rear wheel (Wheel)
30 Hydraulic system
40 Hydraulic actuator (Actuator)
50 Hydraulic clutch
60 Valve unit
61 Oil flow path
61A Upstream-side oil flow path
61B Downstream-side oil flow path
61C Bypass flow path
62, 62A Solenoid valve (Valve member)
63 One-way valve
64 Hydraulic pressure sensor
64A Upstream-side hydraulic pressure sensor
64B Downstream-side hydraulic pressure sensor
65 Accumulator
90 Control unit
HP Upper limit holding hydraulic pressure (Predetermined hydraulic pressure)
LP Lower limit holding hydraulic pressure (Further hydraulic pressure)
TP Touch point hydraulic pressure

The invention claimed is:

1. A hydraulic system (30), comprising:
    a normally open-type hydraulic clutch (50) which connects or disconnects a power transmission line between an engine (6) and a wheel (RW);
    an actuator (40) which supplies a hydraulic pressure to the hydraulic clutch (50);
    an oil flow path (61) which connects the actuator (40) to the hydraulic clutch (50);
    a valve member (62, 62A) which is provided on the oil flow path (61), and which enables to switch between an open state where the oil flow path (61) communicates and a closed state where the oil flow path (61) closes; and
    a hydraulic pressure sensor (64B) which is provided on the oil flow path (61) on a downstream side of the valve member (62, 62A),
    wherein the hydraulic system (30) further comprises a bypass flow path (61C) which bypasses the valve member (62, 62A), and
    wherein a one-way valve (63), which permits a supply of a hydraulic pressure from an actuator (40) side to a hydraulic clutch (50) side and which shuts off a supply of a hydraulic pressure from the hydraulic clutch (50) side to the actuator (40) side, is provided on the bypass flow path (61C), wherein the hydraulic system (30) comprises a control unit (90) which controls the actuator (40) and the valve member (62, 62A), wherein the control unit (90)

activates the actuator (40) and opens the valve member (62, 62A) to engage the hydraulic clutch (50), and thereafter stops the actuator (40) and closes the valve member (62, 62A), activates the actuator (40) while keeping the valve member (62, 62A) closed to supply a hydraulic pressure to the hydraulic clutch (50) side through the one-way valve (63) when a detection value of the hydraulic pressure sensor (64B) provided on a downstream side of the valve member (62, 62A) decreases below a predetermined hydraulic pressure (LP) with the hydraulic clutch (50) kept engaged, and stops the actuator (40) when a detection value of the hydraulic pressure sensor (64B) provided on the downstream side of the valve member (62, 62A) reaches or exceeds the predetermined hydraulic pressure (LP), and wherein the control unit (90)

opens the valve member (62, 62A) while keeping the actuator (40) stopped to release a hydraulic pressure on the hydraulic clutch (50) side when a detection value of the hydraulic pressure sensor (64B) provided on a downstream side of the valve member (62, 62A) exceeds a further predetermined hydraulic pressure (HP) with the hydraulic clutch (50) kept engaged, and closes the valve member (62, 62A) when a detection value of the hydraulic pressure sensor (64B) provided on the downstream side of the valve member (62, 62A) is less than the further predetermined hydraulic pressure (HP).

2. The hydraulic system (30) according to claim 1, wherein the control unit (90) opens the valve member (62, 62A) in a step-by-step fashion.

3. The hydraulic system (30) according to claim 1, wherein the valve member (62, 62A), the one-way valve (63), and the hydraulic pressure sensor (64B) are mounted or incorporated in a case member (66) to form a valve unit (60).

4. The hydraulic system (30) according to claim 3, wherein an accumulator (65) is mounted or incorporated in the case member (66) to form the valve unit (60).

5. The hydraulic system (30) according to claim 1, wherein the valve member (62, 62A), the one-way valve (63), and the hydraulic pressure sensor (64B) are mounted or incorporated in a case member (66) to form a valve unit (60), wherein a first communication hole (67) and a second communication hole (68), which penetrate in a vertical direction, are provided in the case member (66), wherein an upstream-side hydraulic pressure sensor (64A) is attached to the first communication hole (67), and wherein the hydraulic pressure sensor (64B) is attached to the second communication hole (68).

6. The hydraulic system (30) according to claim 5, wherein the valve unit (60) further includes an accumulator (65), wherein the first communication hole (67) and the second communication hole (68) communicate with each other through a connecting hole (85) which is formed horizontally, and wherein the valve member (62) and the accumulator (65), provided on the downstream side of the valve member (62), are attached to the connecting hole (85).

7. A hydraulic system (30), comprising:

a normally open-type hydraulic clutch (50) which connects or disconnects a power transmission line between an engine (6) and a wheel (RW);

an actuator (40), which is a hydraulic actuator (40), and which supplies a hydraulic pressure to the hydraulic clutch (50);

an oil flow path (61) which connects the actuator (40) to the hydraulic clutch (50);

a valve unit (60) being provided on the oil flow path (61), including:

a valve member (62, 62A), which is a solenoid valve, and which is provided on the oil flow path (61), and which enables to switch between an open state where the oil flow path (61) communicates and a closed state where the oil flow path (61) closes;

a downstream-side hydraulic pressure sensor (64B) provided on a downstream side of the valve member (62, 62A);

an upstream-side hydraulic pressure sensor (64A) provided on an upstream side of the valve member (62, 62A), a bypass flow path (61C) which bypasses the valve member (62, 62A), and a one-way valve (63), which permits a supply of a hydraulic pressure from an actuator (40) side to a hydraulic clutch (50) side and which shuts off a supply of a hydraulic pressure from the hydraulic clutch (50) side to the actuator (40) side, is provided on the bypass flow path (61C), wherein in the actuator (40), an oil pump (42) being driven by an electric motor (41) is adapted to draw hydraulic fluid from a reservoir (43) and to supply the hydraulic fluid to the hydraulic clutch (50) through a master cylinder (44), the oil flow path (61) and the valve unit (60), wherein the hydraulic system (30) comprises a control unit (90) which controls the actuator (40) and the valve member (62, 62A), wherein the control unit (90)

activates the actuator (40) and opens the valve member (62, 62A) to engage the hydraulic clutch (50), and thereafter stops the actuator (40) and closes the valve member (62, 62A), activates the actuator (40) while keeping the valve member (62, 62A) closed to supply a hydraulic pressure to the hydraulic clutch (50) side through the one way valve (63) when a detection value of the hydraulic pressure sensor (64B) provided on a downstream side of the valve member (62, 62A) decreases below a predetermined hydraulic pressure (LP) with the hydraulic clutch (50) kept engaged, and stops the actuator (40) when a detection value of the hydraulic pressure sensor (64B) provided on the downstream side of the valve member (62, 62A) reaches or exceeds the predetermined hydraulic pressure (LP), and wherein the control unit (90)

opens the valve member (62, 62A) while keeping the actuator (40) stopped to release a hydraulic pressure on the hydraulic clutch (50) side when a detection value of the hydraulic pressure sensor (64B) provided on a downstream side of the valve member (62, 62A) exceeds a further predetermined hydraulic pressure (HP) with the hydraulic clutch (50) kept engaged, and closes the valve member (62, 62A) when a detection value of the hydraulic pressure sensor (64B) provided on the downstream side of the valve member (62, 62A) is less than the further predetermined hydraulic pressure (HP).

8. The hydraulic system (30) according to claim 7,
wherein the valve unit (60) further includes an accumulator (65) on a downstream side of the valve member (62, 62A).

9. The hydraulic system (30) according to claim 7,
wherein the control unit (90) opens the valve member (62, 62A) in a step by step fashion.

10. A hydraulic system (30), comprising:
a normally open-type hydraulic clutch (50) which connects or disconnects a power transmission line between an engine (6) and a wheel (RW);
an actuator (40) which supplies a hydraulic pressure to the hydraulic clutch (50);
an oil flow path (61) which connects the actuator (40) to the hydraulic clutch (50);
a valve member (62, 62A) which is provided on the oil flow path (61), and which enables to switch between an open state where the oil flow path (61) communicates and a closed state where the oil flow path (61) closes;
a hydraulic pressure sensor (64B) which is provided on the oil flow path (61); and
an accumulator (65) on a downstream side of the valve member (62, 62A),
wherein the hydraulic system (30) further comprises a bypass flow path (61C) which bypasses the valve member (62, 62A), and
wherein a one-way valve (63), which permits a supply of a hydraulic pressure from an actuator (40) side to a hydraulic clutch (50) side and which shuts off a supply of a hydraulic pressure from the hydraulic clutch (50) side to the actuator (40) side, is provided on the bypass flow path (61C),
wherein the hydraulic system (30) comprises a control unit (90) which controls the actuator (40) and the valve member (62, 62A), and
wherein the control unit (90)
activates the actuator (40) and opens the valve member (62, 62A) to engage the hydraulic clutch (50), and thereafter stops the actuator (40) and closes the valve member (62, 62A),
activates the actuator (40) while keeping the valve member (62, 62A) closed to supply a hydraulic pressure to the hydraulic clutch (50) side through the one-way valve (63) when a detection value of the hydraulic pressure sensor (64B), which is provided on a downstream side of the valve member (62, 62A) decreases below a predetermined hydraulic pressure (LP) with the hydraulic clutch (50) kept engaged, and
stops the actuator (40) when a detection value of the hydraulic pressure sensor (64B) provided on the downstream side of the valve member (62, 62A) reaches or exceeds the predetermined hydraulic pressure (LP), and
wherein the control unit (90)
opens the valve member (62, 62A) while keeping the actuator (40) stopped to release a hydraulic pressure on the hydraulic clutch (50) side when a detection value of the hydraulic pressure sensor (64B) provided on a downstream side of the valve member (62, 62A) exceeds a further predetermined hydraulic pressure (HP) with the hydraulic clutch (50) kept engaged, and
closes the valve member (62, 62A) when a detection value of the hydraulic pressure sensor (64B) provided on the downstream side of the valve member (62, 62A) is less than the further predetermined hydraulic pressure (HP).

\* \* \* \* \*